US012755196B2

(12) United States Patent
Zawad et al.

(10) Patent No.: US 12,755,196 B2
(45) Date of Patent: Oct. 6, 2026

(54) TRAINING MODELS UNDER RESOURCE CONSTRAINTS FOR CROSS-DEVICE FEDERATED LEARNING

(71) Applicant: International Business Machines Corporation, Armonk, NY (US)

(72) Inventors: Syed Zawad, San Jose, CA (US); Nathalie Baracaldo Angel, San Jose, CA (US); Yi Zhou, San Jose, CA (US); Swanand Ravindra Kadhe, San Jose, CA (US); Wesley M. Gifford, Ridgefield, CT (US)

(73) Assignee: International Business Machines Corporation, Armonk, NY (US)

(*) Notice: Subject to any disclaimer, the term of this patent is extended or adjusted under 35 U.S.C. 154(b) by 759 days.

(21) Appl. No.: 18/139,765

(22) Filed: Apr. 26, 2023

(65) Prior Publication Data

US 2024/0362521 A1 Oct. 31, 2024

(51) Int. Cl.

*G06N 20/00* (2019.01)
*G06N 3/045* (2023.01)
(Continued)

(52) U.S. Cl.

CPC .................................... *G06N 20/00* (2019.01)

(58) Field of Classification Search

CPC .......... G06N 20/00; G06N 3/045; G06N 3/08; G06N 3/084; G06N 3/0455; G06N 3/0895;
(Continued)

(56) References Cited

U.S. PATENT DOCUMENTS

| | | | |
|---|---|---|---|
| 2020/0364608 A1 | 11/2020 | Anwar et al. |
| 2021/0174243 A1 | 6/2021 | Angel et al. |
| 2022/0083906 A1 | 3/2022 | Ong et al. |

FOREIGN PATENT DOCUMENTS

| | | |
|---|---|---|
| CN | 111695640 A | 9/2020 |
| CN | 111866869 A | 10/2020 |

(Continued)

OTHER PUBLICATIONS

Zhao et al., When does the student surpass the teacher? Federated Semi-supervised Learning with Teacher-Student EMA, Jan. 24, 2023, https://arxiv.org/pdf/2301.10114 (Year: 2023).*

(Continued)

*Primary Examiner* — Kakali Chaki
*Assistant Examiner* — Molly C Sippel
(74) *Attorney, Agent, or Firm* — Kristofer Haggerty

(57) ABSTRACT

A system and a computer-implemented method of training a global student model is disclosed. The global student model and a teacher model are stored on a server and each include a first layer. The method includes transmitting local student models based on the global student model, the local student models each including an embedding layer and a first layer. The method includes receiving an embedding layer output of one of the local student models. The method includes performing a forward pass on the first layer of the teacher model, with the embedding layer output as an input, to generate a teacher model first layer output. The method includes transmitting the teacher model first layer output. The method includes receiving first layer weights of the local student models. The method includes calculating first layer weights of the global student model using the received first layer weights of the local student models.

20 Claims, 17 Drawing Sheets

(51) Int. Cl.
*G06N 3/08* (2023.01)
*G06N 3/084* (2023.01)

(58) Field of Classification Search
CPC .......... G06N 3/09; G06N 3/091; G06N 3/092; G06N 3/094; G06N 3/096; G06N 3/098; G06N 3/0985
See application file for complete search history.

(56) References Cited

FOREIGN PATENT DOCUMENTS

| | | |
|---|---|---|
| CN | 112333216 A | 2/2021 |
| CN | 112232528 B | 3/2021 |
| CN | 115086399 A | 9/2022 |

OTHER PUBLICATIONS

Tan et al., Federated Learning from Pre-Trained Models: A Contrastive Learning Approach, Sep. 21, 2022, https://arxiv.org/pdf/2209.10083 (Year: 2022).*
Cao et al., C2S: Class-aware client selection for effective aggregation in federated learning, High-Confidence Computing, vol. 2, Issue 3, 2022, 100068, ISSN 2667-2952, https://doi.org/10.1016/j.hcc.2022.100068. (Year: 2022).*
Tian et al., FedBERT: When Federated Learning Meets Pre-training, Aug. 24, 2022, ACM Trans. Intell. Syst. Technol. 13, 4, Article 66 (Aug. 2022), 26 pages. https://doi.org/10.1145/3510033 (Year: 2022).*
Chan et al., FedIN: Federated Intermediate Layers Learning for Model Heterogeneity, Apr. 12, 2023, https://arxiv.org/pdf/2304.00759v2 (Year: 2023).*
Caldas et al. (Dec. 9, 2019) LEAF: A Benchmark for Federated Settings.
Devlin et al. (May 24, 2019) BERT: Pre-training of Deep Bidirectional Transformers for Language Understanding.
Seo et al. (Nov. 4, 2020) Federated Knowledge Distillation.
Lin et al. (Mar. 27, 2021) Ensemble Distillation for Robust Model Fusion in Federated Learning.
Yao et al. (Sep. 13, 2021) Local-Global Knowledge Distillation In Heterogeneous Federated Learning With Non-lid Data.
Zhang et al. (2022). Fine-tuning global model via data-free knowledge distillation for Non-IID Federated Learning. 2022 IEEE/CVF Conference on Computer Vision and Pattern Recognition (CVPR). https://doi.org/10.1109/cvpr52688.2022.00993.
Zhang et al. (2022). Multi-agent reinforcement learning with General Utilities via decentralized shadow reward actor-critic. Proceedings of the AAAI Conference on Artificial Intelligence, 36(8), 9031-9039. https://doi.org/10.1609/aaai.v3618.20887.
Lin et al. (2022). FEDNLP: Benchmarking Federated Learning Methods for Natural Language Processing Tasks. Findings of the Association for Computational Linguistics: NAACL 2022. https://doi.org/10.18653/v1/2022.findings-naacl. 13.
Zhu et al. (2021) Data-Free Knowledge Distillation for Heterogeneous Federated Learning.
Wu et al. (2022). Communication-efficient federated learning via knowledge distillation. Nature Communications, 13(1). https://doi.org/10.1038/s41467-022-29763-x.
He et al. (2020) Group Knowledge Transfer: Federated Learning of Large CNNs at the Edge.
Zhang et al. (Apr. 5, 2022) FedZKT: Zero-Shot Knowledge Transfer towards Resource-Constrained Federated Learning with Heterogeneous On-Device Models.
Nguyen et al. (Apr. 4, 2022) CDKT-FL: Cross-Device Knowledge Transfer using Proxy Dataset in Federated Learning.
Tao et al. (Aug. 23, 2022) Training Vision Transformers in Federated Learning with Limited Edge-Device Resources.

* cited by examiner

500

TRAINING MODELS UNDER RESOURCE CONSTRAINTS FOR CROSS-DEVICE FEDERATED LEARNING

TECHNICAL FIELD

The present application relates to systems and methods for training global student models and, more particularly, to systems and methods for training global student models using devices under resource constraints for cross-device federated learning.

BACKGROUND

Currently, in the field of computer-executed applications, foundation models are trained on large amounts of raw, unlabeled data for use with an array of tasks and other applications. Examples of foundation models include, but are not limited to, DALL-E, GPT-2, GPT-3, GPT-4, ULM and BERT. One approach to training these foundation models is using federated learning, where multiple individuals or entities remotely share their data to train a single deep learning model in a collaborative fashion. This approach typically involves each party downloading the foundation model (usually already pre-trained) and running it on a local device (e.g., a smart phone, IoT device, sensor network, or other computer device) of the party.

Oftentimes, there are privacy issues related to the data that would otherwise be shared for the collaborative training. For example, Health Insurance Portability and Accountability Act (HIPAA) governs the sharing of medical records. Other examples of legislation related to data privacy are the General Data Protection Regulation (GDPR) and the California Consumer Privacy Act (CCPA). Further, many industries exist where sharing data could pose a significant competitive disadvantage to the companies sharing data, such as cable companies, banks, and the like that compete within the same domain. Concerns like these make federated learning an appealing approach because a machine learning model can be trained without sharing or revealing training data.

However, there are many current drawbacks to federated learning. Training foundation models in federated learning with existing techniques leads to low model quality in terms of accuracy. Additionally, foundation models are expensive to train, typically requiring hundreds of graphics processing unit (GPU) hours to train in centralized systems. Further, in cross-device federated learning scenarios, where data often resides in resource-constrained devices, training foundation models is unfeasible. These resource-constrained devices generally have limited computational and memory resources for local model training and limited battery life and availability.

The present disclosure is directed to overcoming these and other problems of the prior art.

SUMMARY

Embodiments of the present invention address and overcome one or more of the above shortcomings and drawbacks, by providing systems and methods of training a global student model stored on a server.

According to an embodiment of the present disclosure, a computer-implemented method of training a global student model is disclosed and can include: storing, on a server, the global student model comprising a first layer and a teacher model comprising a first layer; transmitting, from the server, local student models based on the global student model, the local student models each comprising an embedding layer and a first layer; receiving, at the server, an embedding layer output of one of the local student models; performing, on the server, a forward pass on the first layer of the teacher model, with the embedding layer output as an input, to generate a teacher model first layer output; transmitting, from the server, the teacher model first layer output; receiving, at the server, first layer weights of the local student models; and calculating, on the server, first layer weights of the global student model using the received first layer weights of the local student models.

In some embodiments, the local student models are each transmitted to a different client device.

In some embodiments, the local student model training layer weights are aggregated by weighing the local student models based on training sample size.

In some embodiments, the calculating, on the server, the first layer weights of the global student model includes a federated averaging process.

In some embodiments, the computer-implemented method further includes: training, on the server, the teacher model on public datasets.

In some embodiments, the computer-implemented method further includes: selecting, by the server, a number of clients to transmit the first teacher model output from a number of available clients, each selected client receiving one of the local student models.

In some embodiments, each client of the number of clients includes one or more client devices.

In some embodiments, each client device comprises locally stored data sets.

In some embodiments, the embedding layer output does not include data from a data set stored locally on a client device.

In some embodiments, the embedding layer is pre-trained on the server using the teacher model.

In some embodiments, the local student models are not transmitted until a loss of the embedding layer is less than a threshold loss.

In some embodiments, the method further includes: performing, on the server, a forward pass on a second layer of the teacher model, with the embedding layer output as an input, to generate a teacher model second layer output; transmitting, from the server, the teacher model second layer output; receiving, at the server, second layer weights of the local student models; and calculating, on the server, second layer weights of the global student model using the received second layer weights of the local student models.

According to another embodiment of the present disclosure, a computer-implemented method of training a global student model is disclosed and can include: receiving, on a client device comprising a data set, a local student model based on the global student model, the local student model comprising an embedding layer and a first layer; outputting, on the client device, an embedding layer output from the embedding layer; transmitting, from the client device, the embedding layer output; performing, on the client device, a forward pass on the first layer, with the embedding layer output as an input, to generate a student model first layer output; receiving, on the client device, a teacher model first layer output; calculating, on the client device, a loss based on the student model first layer output and the teacher model first layer output; training, on the client device, the first layer of the local student model until the student model first layer output converges with the teacher model first layer output;

and transmitting, from the client device, first layer weights of the first layer of the local student model.

In some embodiments, the embedding layer output does not include data from the data set.

In some embodiments, the computer-implemented method further includes: performing, on the client device, a forward pass on a second layer of the local student model, with the embedding layer output as an input, to generate a student model second layer output; receiving, on the client device, a teacher model second layer output; calculating, on the client device, a loss based on the local student model second layer output and the teacher model second layer output; training, on the client device, the second layer of the student model until the student model second layer output converges with the teacher model second layer output; and transmitting, from the client device, second layer weights of the second layer of the local student model.

In some embodiments, the client device uses linear layers to match the local student model first layer output and the teacher model first layer output.

In some embodiments, the client device trains the local student model using a Kullback-Leibler loss function.

According to another embodiment of the present disclosure, a system of training a global student model stored on a server is disclosed, the server including a processing device and a memory including instructions that are executed by the processing device to perform a method including: storing, on the server, a global student model comprising a first layer and a teacher model comprising a first layer; transmitting, from the server, local student models based on the global student model, the local student models each comprising an embedding layer and a first layer; receiving, at the server, an embedding layer output of one of the local student models; performing, on the server, a forward pass on the first layer of the teacher model, with the embedding layer output as an input, to generate a teacher model first layer output; transmitting, from the server, the teacher model first layer output; receiving, at the server, first layer weights of the local student models; and calculating, on the server, first layer weights of the global student model using the received first layer weights of the local student models.

In some embodiments, the local student models are each transmitted to a different client device.

In some embodiments, the received embedding layer output does not include data from a data set stored locally on a client device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional features and advantages of the disclosed technology will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Overview

The present disclosure provides methods and systems that are capable of training models based on a larger model (e.g., a foundation model) in resource-constrained devices without requiring data transfers to a central server or auxiliary data while still maintaining a high level of accuracy with the final trained model. The present disclosure utilizes a smaller model on a client-side in order to train a larger model on a server-side. The disclosed systems and methods do not require any users/organizations to share any data.

Figure 1:
FIG. 1 depicts a flow chart of an exemplary method of training models, according to an embodiment of the disclosure.

FIG. 1 depicts a high-level flow chart depicting a method 10 according to an embodiment of the present disclosure. Local student models that are based on a global student model are transmitted from a server to a plurality of client devices in a first group thereof (Step 12). While only one client device is described in this flow chart, it will be appreciated that the same method can be performed on multiple client devices either concurrently, semi-concurrently, or at different times from one another to train the global student model. Next, an embedding layer output from the local student model is generated using client data (Step 14). This embedding layer out is transmitted to a server-side teacher model (Step 16). A forward pass is performed, on the server, on a first layer of the teacher model and, on the client device, a first layer of the student model, generating a teacher model first layer output and a student model first layer output, respectively (Step 18). The teacher model first layer output is transmitted to the client device (Step 20). A loss is calculated on the client device based on the teacher model first layer output and the student model first layer output (Step 22). The student model first layer is trained until it converges with the teacher model first layer (Step 24). Once convergence occurs, the weights of that first layer of the local student model are frozen, and the local student model first layer weights are transmitted to the server (Step 26). The first layer of the global student model weights are then calculated on the server using the received local student model weights from the plurality of client devices (Step 28). Once the global student model first layer is trained, this process is repeated for other student model layers until they all converge with respective layers of the teacher model (Step 30). Once the global student model has been updated by the plurality of client devices, an updated local student model can be transmitted to a second group of client devices for further training of the updated global student model (Step 32).

As used herein, the term "teacher model" refers to a large model (e.g., a foundation model) stored and executed on a server that is pre-trained on a training dataset, and then that knowledge is distilled to train a student model.

As used herein, a "student model" refers to a smaller model (relative to the large model) stored and run on a client device that learns to mimic the teacher model and achieve similar accuracy thereto. The student model, in some embodiments, is a distilled version of the teacher model.

In some embodiments, the teacher model can be a foundation model, and the student model can be a distilled version of the foundation model. For the purposes of exemplary illustration, BERT and DistilBERT are used. However, of course, other foundation models that can be trained via federated learning can be used, including, but not limited, to DALL-E, GPT-2, GPT-3, GPT-4, ULM and other NLP machine learning models, without departing from the spirit and scope of the present disclosure. Moreover, the present disclosure may also be applied beyond NLP models, such as with other models that have a larger foundation model or transformer-based architecture with encoder-decoder parts on a server and a smaller model on the client side.

Conventional methods and systems are different from the present disclosure in many ways. For example, conventional systems employ smaller models on the client side that are used to train a larger model on the server-side. No federated aggregation occurs, and the final model is the larger model. Previous solutions inherently have privacy risks because they send output labels to the server directly. Previous solutions also suffer because no layer-wise knowledge distillation is possible because the architectures are significantly different. They are also limited to vision transformer (ViT) problems because a smaller model is challenging to use as a teacher to train larger models for natural language processing (NLP) machine learning models (e.g., BERT).

Embodiments of the present disclosure can have many potential applications. For example, the framework discussed herein could be integrated with Watson Machine Learning. It can also be used by any organization that wants to offer cognitive solutions where training data remains with the user, organizations that train foundation models in federated learning, and organizations that may use Internet of Things (IoT) to train their prediction models. It can also be applicable for highly regulated environments such as healthcare, banking industry or where competition inhibits free sharing of data, companies subject to government regulations, such as GDPR and HIPAA, and/or any consortium where only one entity has the label e.g., common in regulated environments such as banking.

Figure 2:
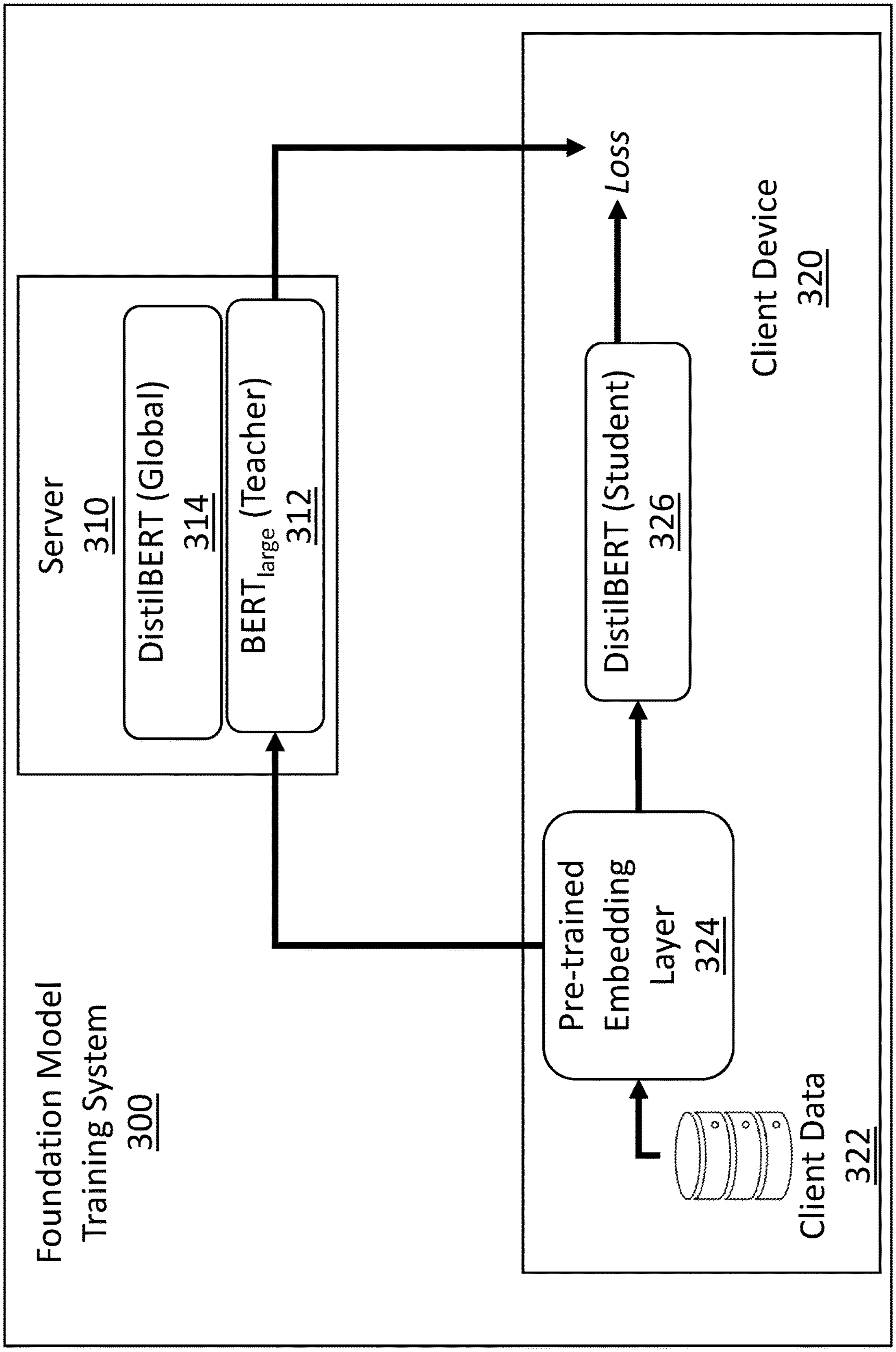
FIG. 2 is a schematic illustration of an exemplary system of training models, according to an embodiment of the disclosure, depicting communication between a server and a client device.

System and Computer-Implemented Method of Training Foundation Models Under Resource Constraints for Cross-Device Federated Learning Making reference to FIG. 2, a system 300 for training student models using resource constrained devices, according to an embodiment of the disclosure, is shown. The system 300 can include a server 310 and a plurality of clients, each client having one or more client devices 320 (discussed more with respect to FIG. 3) that communicate with the server 310 over a network (e.g., wide area network 102 depicted in FIG. 17). The system 300 enables the performance of a method of knowledge distillation for fine-tuning a global student model 314 stored on the server 310 using client devices 320. In particular, this system 300 is useful when clients use resource-constrained client devices 320 for federated learning because it offloads a portion of the computational load to the server 310 rather than requiring it all be done on the resource-constrained client device 320. However, the system 300 can be used with devices 320 of varying computational capacity (including ones with high computational capacity).

The server 310 has a teacher model 312 stored thereon. The teacher model 312 is pre-trained and frozen (i.e., the weights cannot be modified further). Each client device 320 can include client data 322, a pre-trained embedding layer 324 (whose weights are the same as the teacher model 312 arrived at via the method described in FIG. 14), and a student model 326 based on the teacher model 312. As shown in FIG. 2, the server 310 also has a global student model 314 of the local student models 326 that are stored on client devices 320.

The embedding layer 324 is a part of a model. For example, the embedding layer 324 can be the input part of the student model 326 that converts the raw input data 322 into a specific vector (i.e., encoding the data 322), while the student model 326 does some or all of the computation. For the purposes of illustration, the embedding layer 324 and student model 326 are shown as being separate, but the embedding layer 324 can be a part of the teacher model 326.

In federated learning, there is typically a plurality of clients with client devices 320, e.g., user end devices such phones and other computing devices, and a single server 310. The client devices 320 typically have user-specific personal data stored thereon (e.g., passwords, data, etc.). With federated learning, the goal is to train a large deep learning model with these client devices 320 from the different clients. However, the client devices 320 can have restrictive hardware that decreases the efficiency/effectiveness of the training due to the high resource requirements of training deep learning models. Embodiments of the present disclosure can reduce that cost on the client side by offloading a portion of the computation from the client devices 320 to the teacher model on the server 310 without compromising client data 322.

When federated learning is employed, the server 310 cannot observe client data 322. By way of example, the client data 322 could be a number of images (e.g., personal images) stored on the client device 320 (e.g., a smart phone, tablet, or other computing device). If a model is to be trained using that client data 322, the data 322 cannot be transferred to the server 310. In other words, the teacher model 312 cannot directly access the client data 322. Accordingly, each student model 326 needs to be trained on each respective client device 320, and then the weights associated with those trained student models 326 can aggregated (described in greater detail with respect to FIG. 9) back at the server 310 to arrive at a trained global student model 314.

Figure 3:
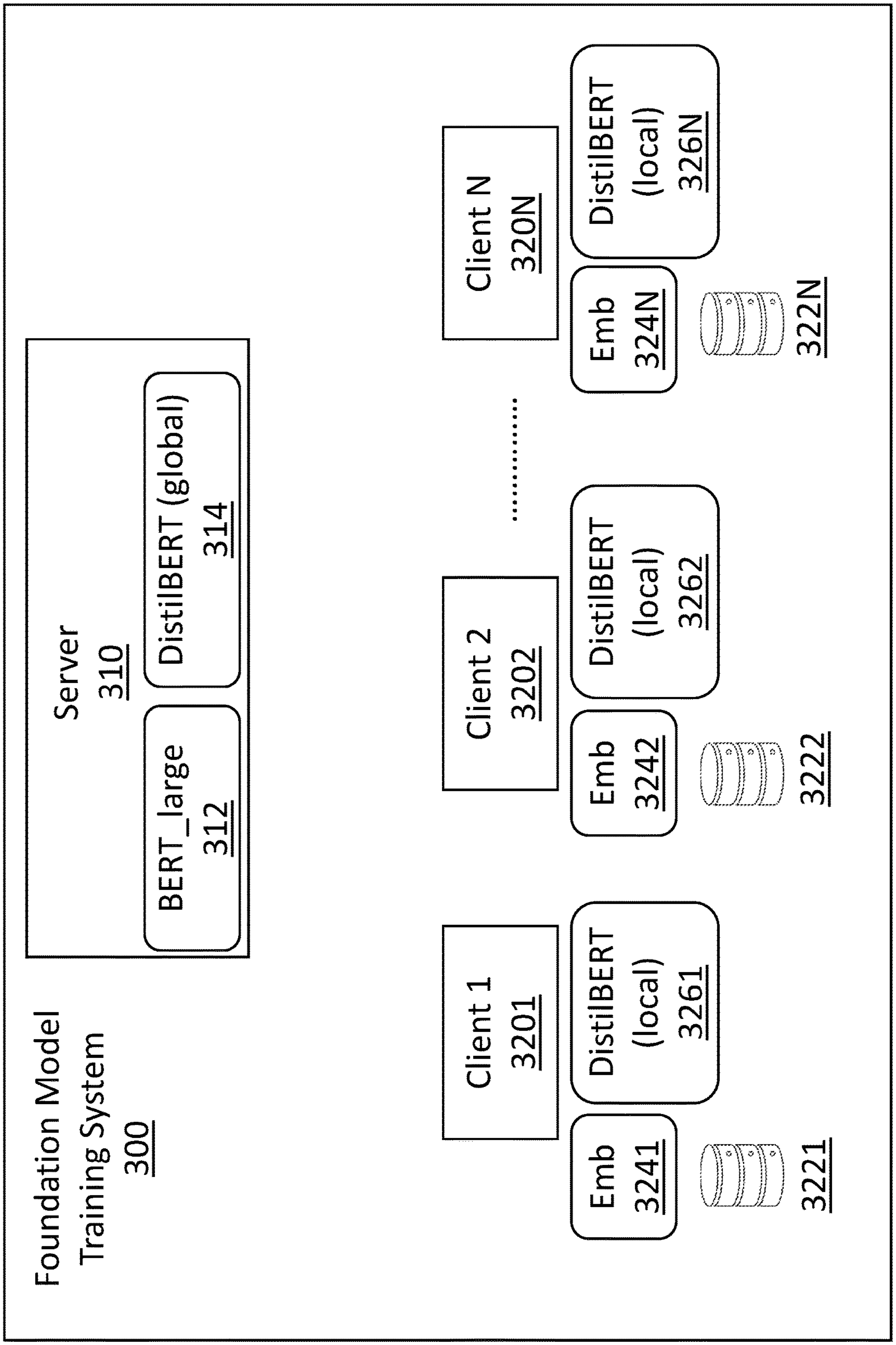
FIG. 3 is another schematic illustration of an exemplary system of training models, depicting the server and multiple client devices, according to an embodiment of the disclosure.

FIG. 3 is a schematic view of the overall system including client devices 3201-320N and the server 310, according to an embodiment of the disclosure. On the client side, each client has their own devices 3201-320N with their own data sets 3221-322N (that are not shared among different clients), embedding layer 3241-324N, and student model 3261-326N. On the server side, the server 310 has its own global student model 314.

At the point in time shown in FIG. 3, the global student model 314 is untrained and, as discussed above, the teacher model 312 is pre-trained. In federated learning, as touched on above, a subset of clients trains a global student model 314, which is then used in a subsequent round by another subset of clients. Thus, to begin the training process, a number N of clients can be randomly selected among the plurality (e.g., hundreds) of clients that are a part of the overall system. In the present example depicted, two clients are selected but, of course, in practice this number can vary.

Figure 4:
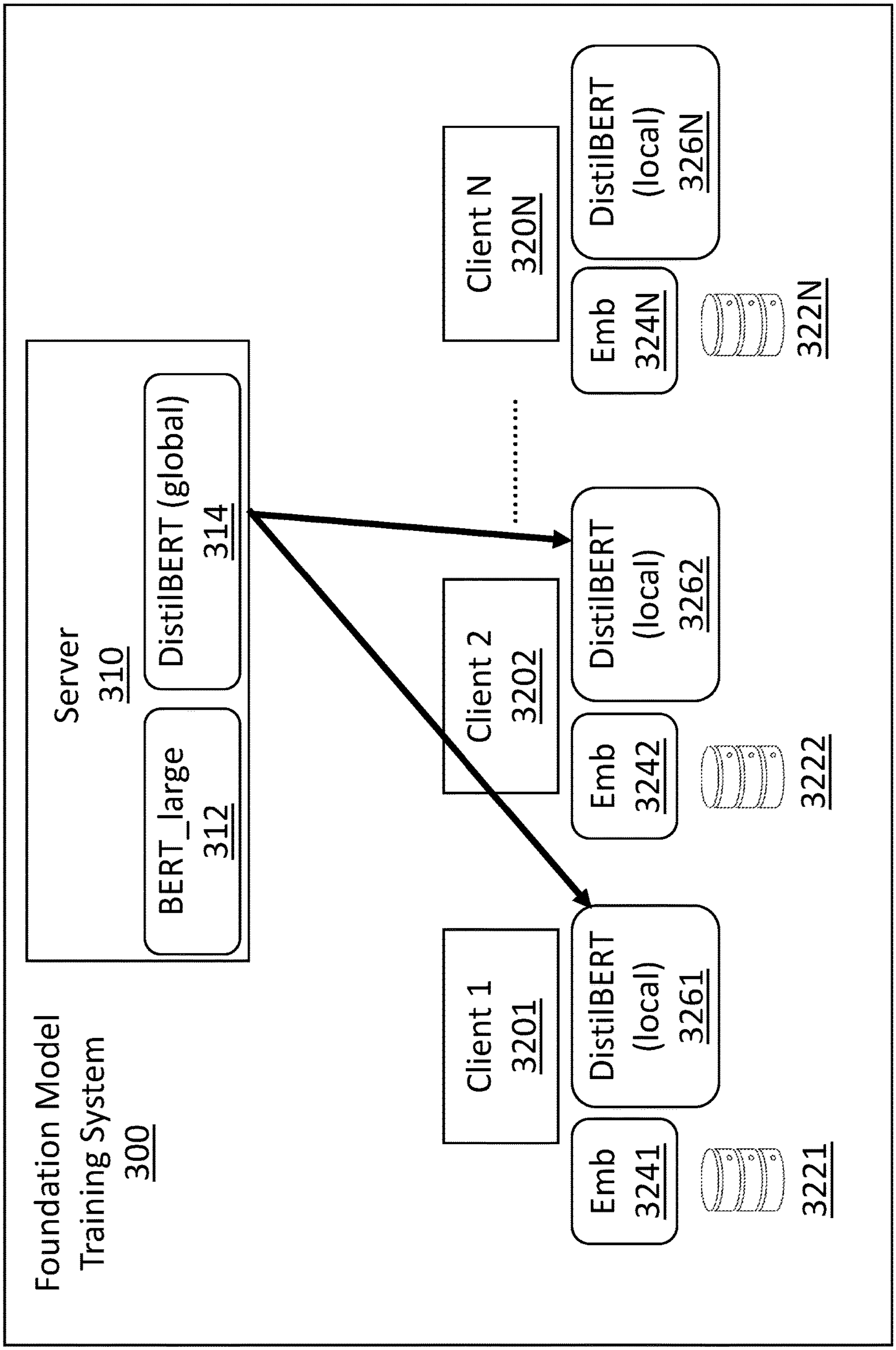
FIG. 4 is another schematic illustration of an exemplary system of training models, depicting transmission of a local student model to the client devices, according to an embodiment of the disclosure.

As shown in FIG. 4, each client's respective devices 3201-326N can be transmitted a local version 3261, 3262 of the global student model 314 whose embedding layer was initially trained by the teacher model 312 (discussed more below with respect to FIG. 14) from the server 310 in order to train the global student model 314. This transmission is denoted by the arrows in FIG. 4.

Figure 5:
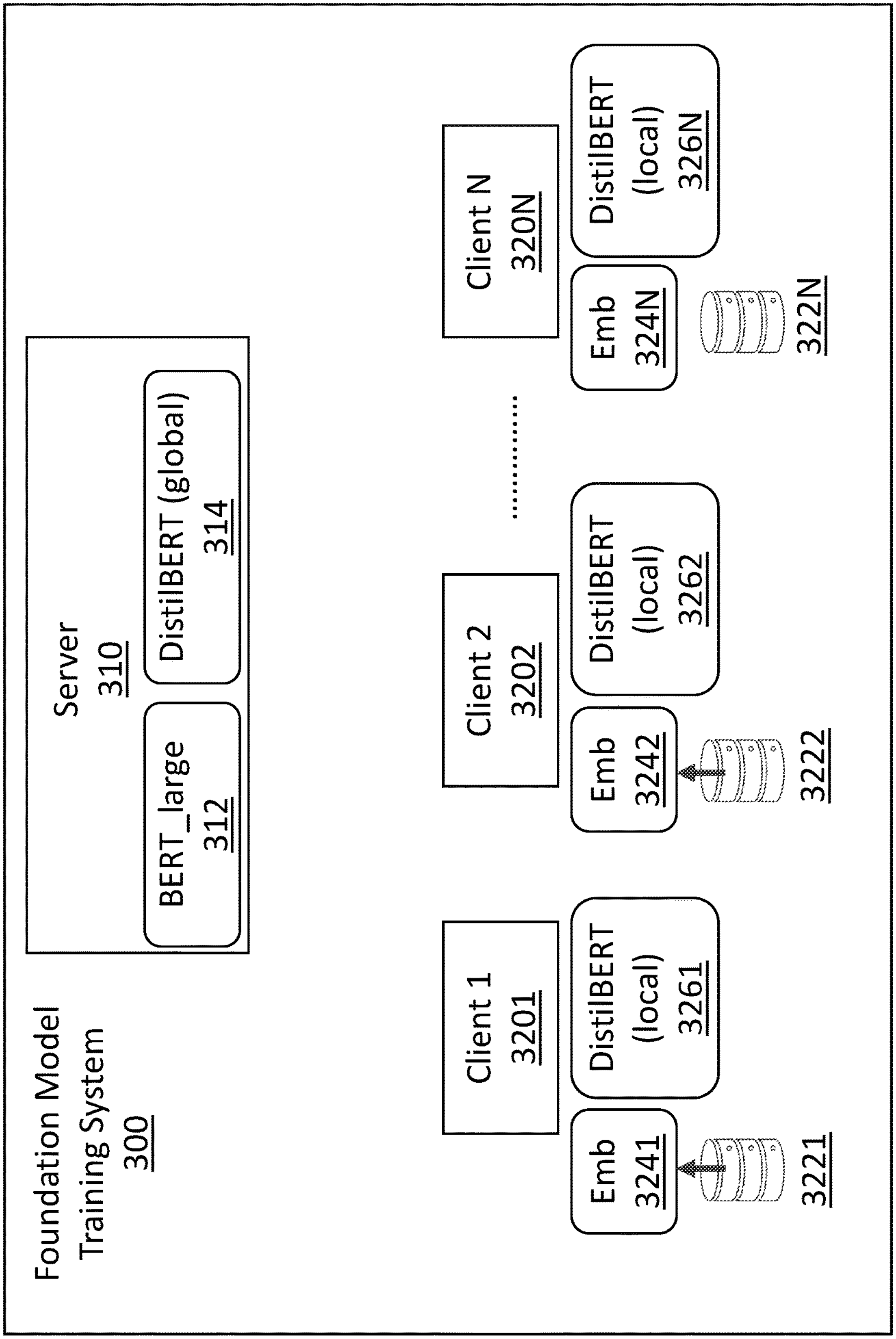
FIG. 5 is another schematic illustration of an exemplary system of training models, depicting client data being loaded into an embedding layer of the local models loaded on the client devices, according to an embodiment of the disclosure.

Making reference to FIG. 5, after transmission of the local student model 326 (shown in FIG. 4, based on the initially trained global student model 314) with the initially trained and frozen embedding layer 3241, 3242 to respective client devices 320N, each client's data 3221, 3222 can be loaded into a respective embedding layer 3241, 3242 (see the arrows in FIG. 5) to yield respective embedding layer outputs. The embedding layer outputs are the outputs of the embedding layer 3241, 3242, not the output of the total student model 3261, 3262.

Figure 6:
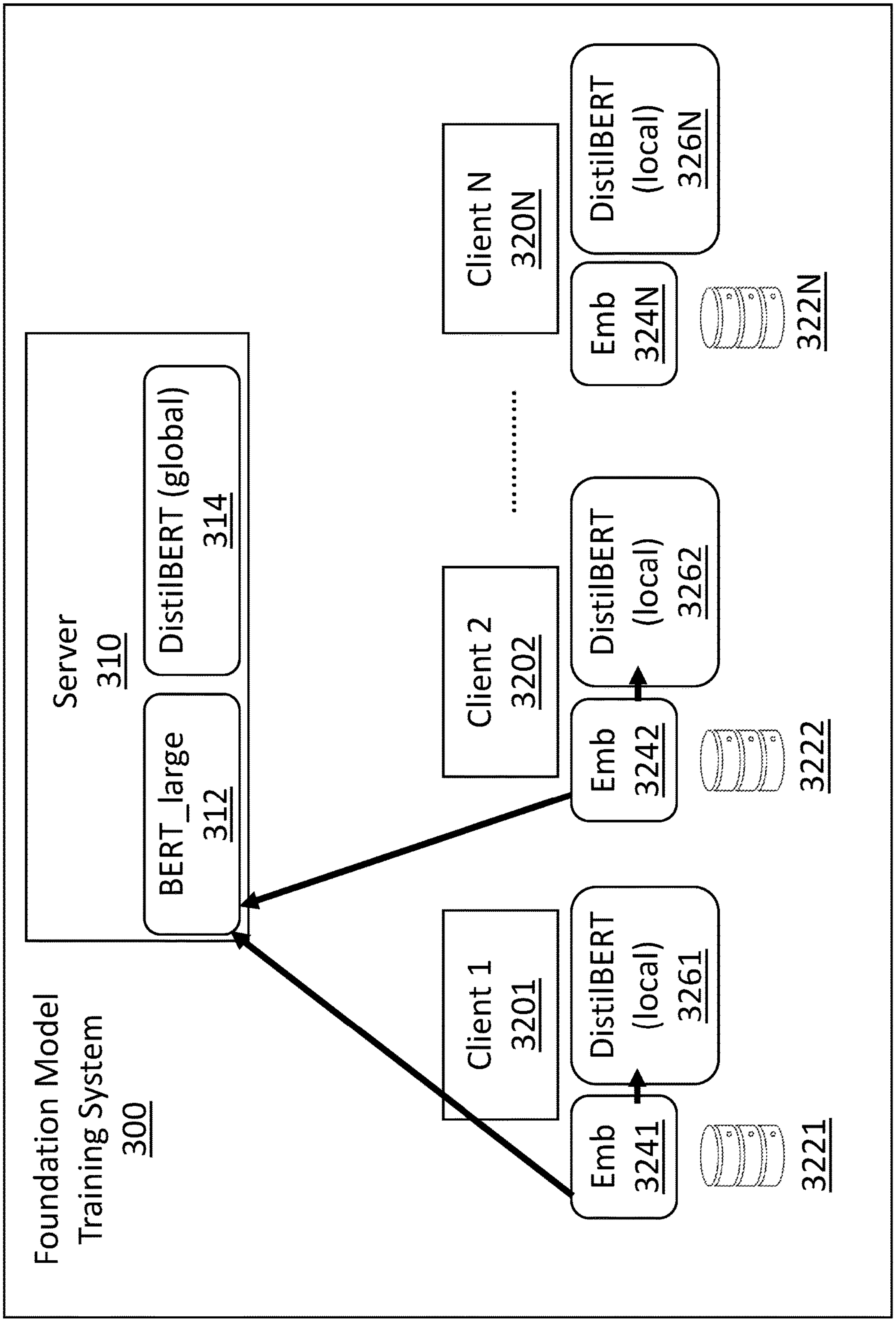
FIG. 6 is another schematic illustration of an exemplary system of training models, depicting transmission of an embedding output layer of the client devices, according to an embodiment of the disclosure.

Turning to FIG. 6, each client device embedding layer output (which does not contain the raw client data 322) can be used as an input for each layer of each client device's respective student model 3261, 3262. Further, this embedding layer output is sent back to the server 310 as an input for the layers of the teacher model 312, as denoted by the arrows in FIG. 6.

Figure 7:
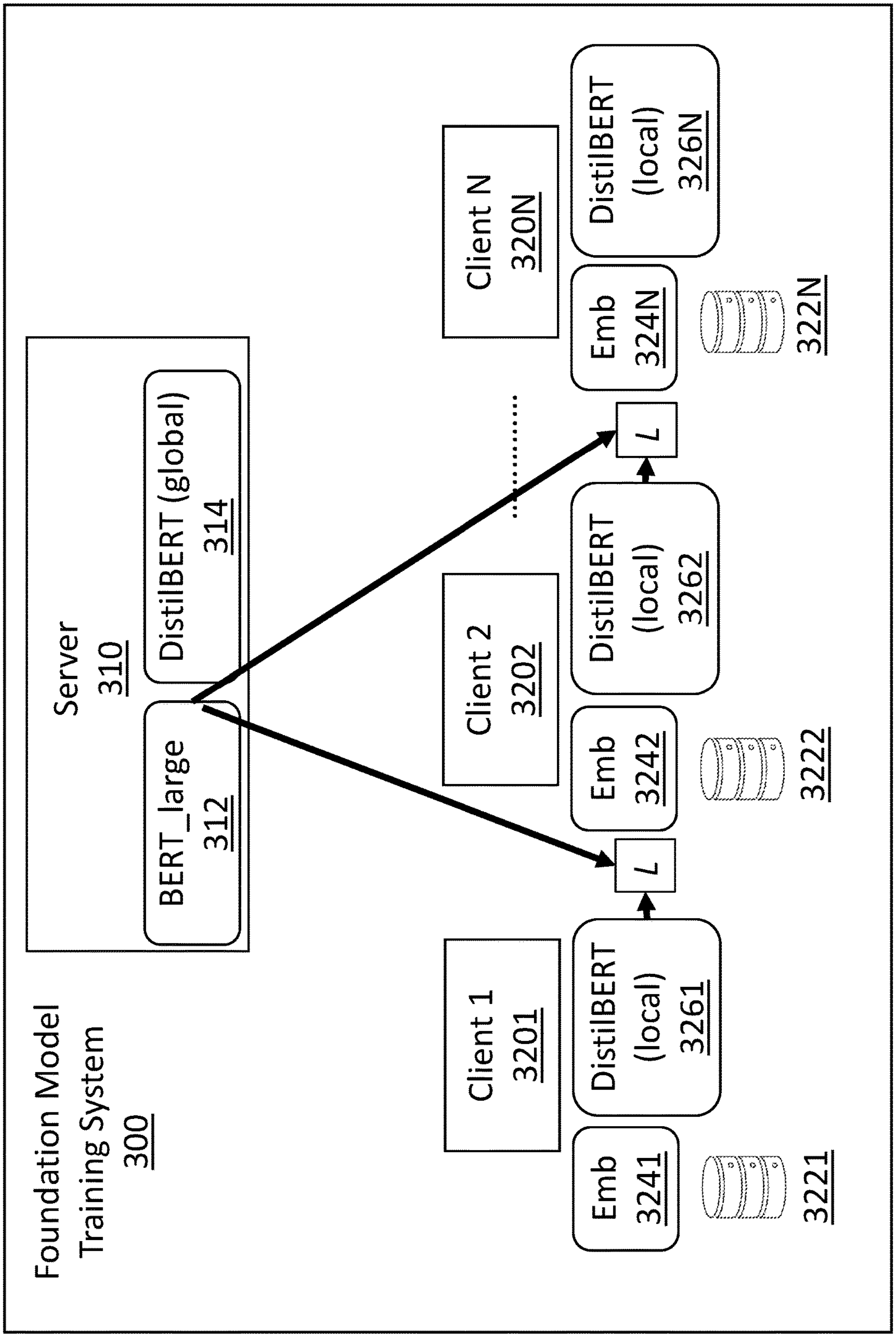
FIG. 7 is another schematic illustration of an exemplary system of training models, depicting a loss computation being performed, according to an embodiment of the disclosure.

For each respective embedding layer output of a respective client device 3201, 3202, they can be taken and put through the rest of the student model 3261, 3262, one layer at a time, to generate a student model layer output as well as a teacher model layer output on the server side when put through the teacher model 312 via a forward pass. As shown in FIG. 7, once the layer output of the teacher model is generated (which is a different output for each client device 3201, 3202 based on the respective embedding layer outputs received), the teacher model layer output is transmitted back to each selected client device 3201, 3202. A loss computation can then be performed for each student model output and teacher model output on the respective client device 3201, 3202, resulting in a respective computed loss. The loss L can be calculated by comparing the difference between the layer outputs of the respective student model 3261, 3262 and the teacher model 312.

Figure 8:
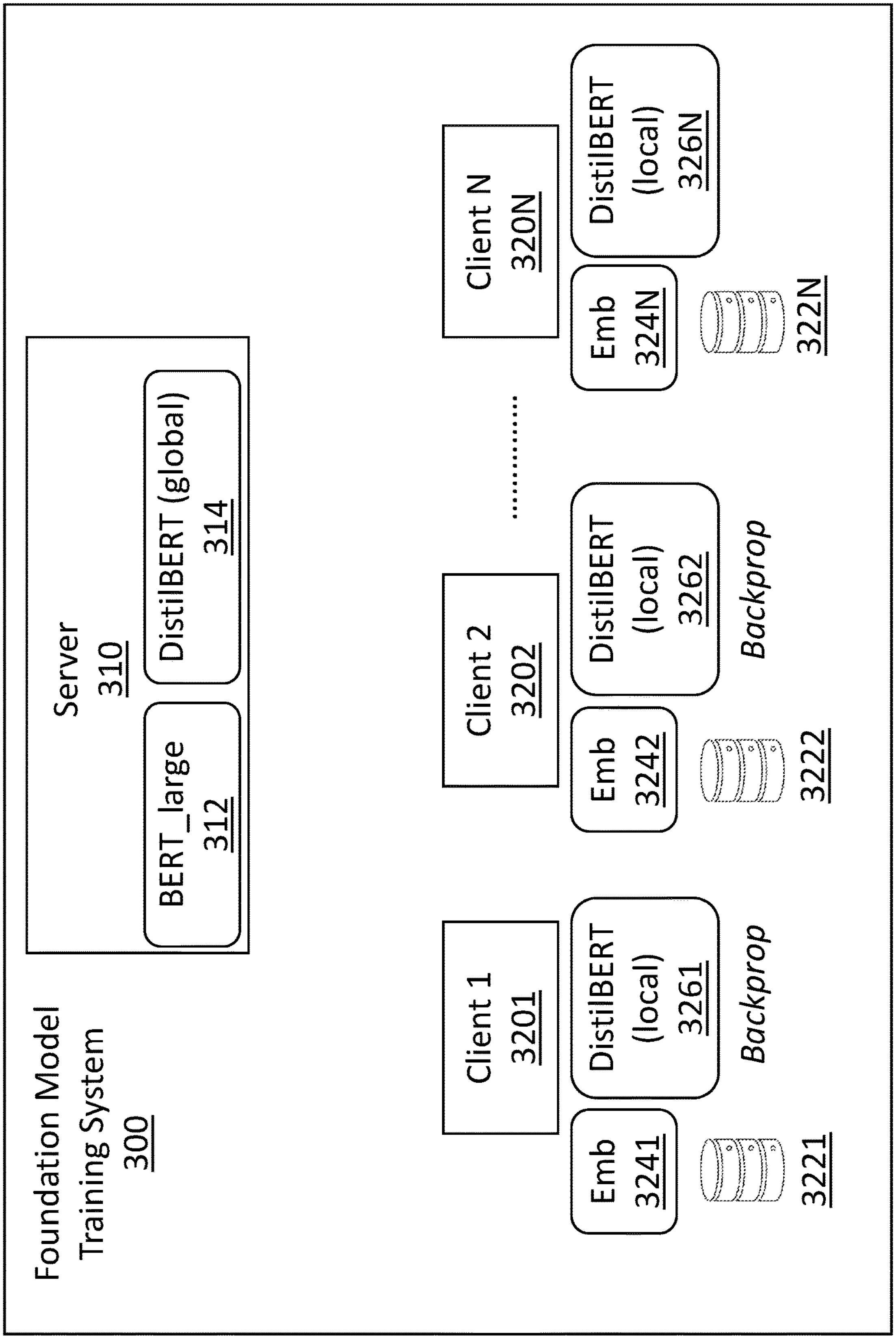
FIG. 8 is another schematic illustration of an exemplary system of training models, depicting a backpropagation step being performed, according to an embodiment of the disclosure.

Next, weights can be computed from the losses, and as shown in FIG. 8, backpropagation can be performed (as well as other traditional machine learning processes). Eventually, fully trained local student models 3261, 3262 are arrived at on the client devices 3201, 3202. Once the teacher and student model layers converge (which is done layer by layer, as detailed more below), it is known that further training is not needed. The weights (which are the trainable parameters in a model) of each layer that is fully trained can then be frozen, meaning that the parameters will not be further changed even if back propagation is used on the subsequent layers.

Figure 9:
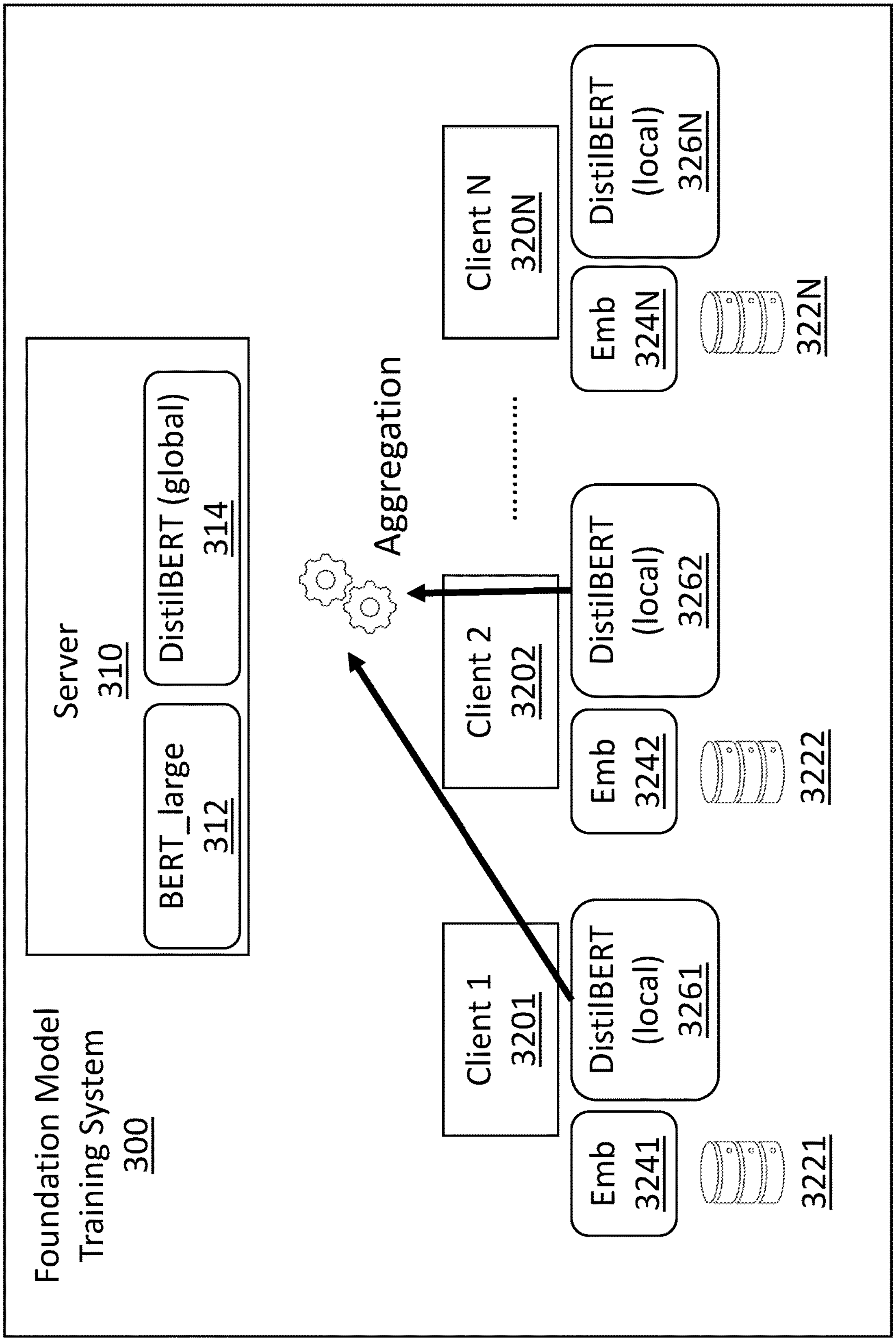
FIG. 9 is another schematic illustration of an exemplary system of training models, depicting aggregation of fully trained student model layers on the client devices, according to an embodiment of the disclosure.
Figure 10:
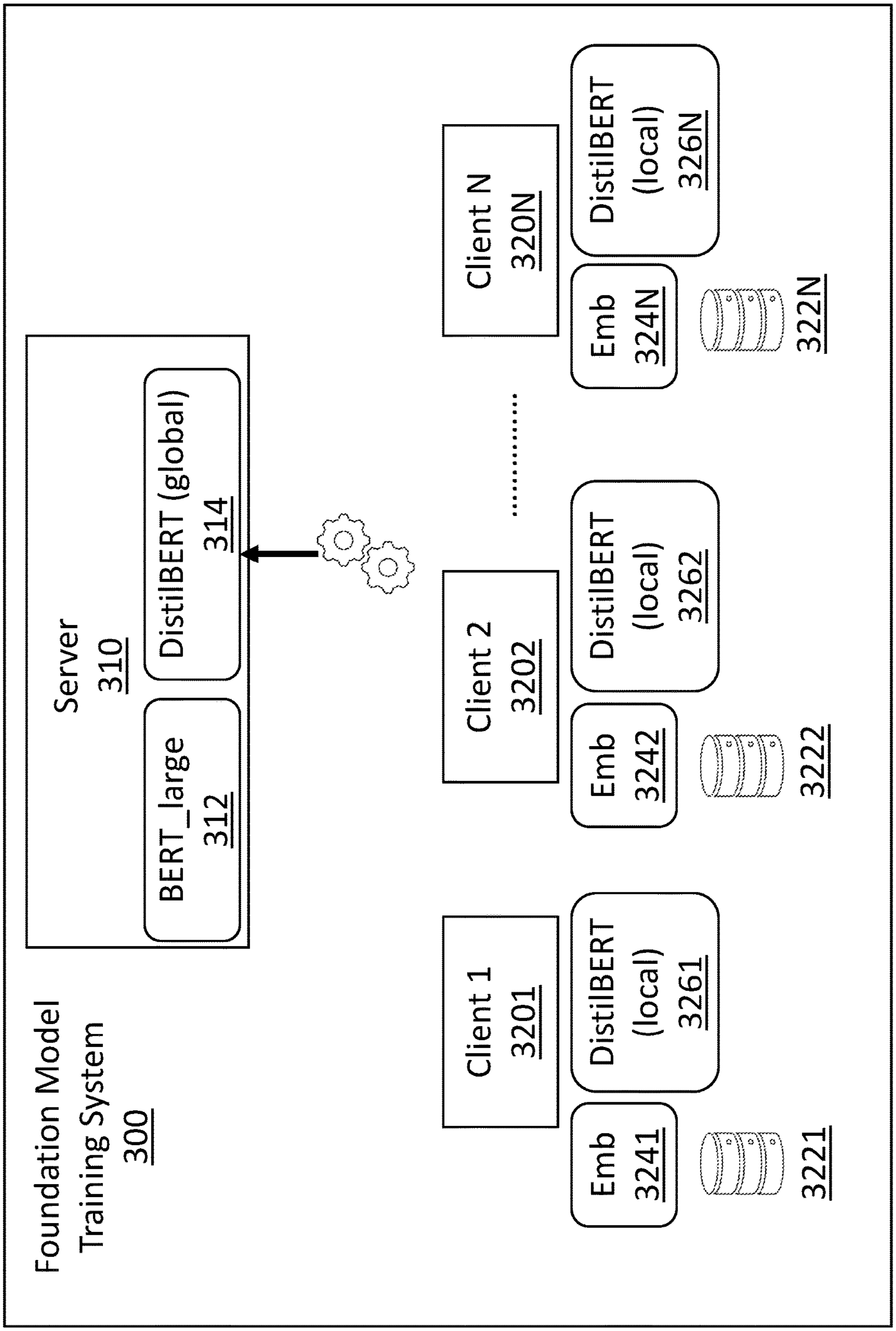
FIG. 10 is another schematic illustration of an exemplary system of training models, depicting arrival at a trained global version of the student model using the aggregated local student models, according to an embodiment of the disclosure.

Making reference to FIGS. 9-10, once respective layers (e.g., first layers) of the student models 3261, 3262 are fully trained, aggregation can be performed (see the arrows in FIG. 9). In the present example, the two student models 3261, 3262 are aggregated by averaging them using each student model's respective training layer weights to arrive at a trained layer of the global student model 314 of the local student model 326, as shown in FIG. 10. In other words, the local student model's weights are aggregated by weighing the local student models 326 based on training sample size. The aggregation can be performed, for example, inside the server 310. Once aggregated, the first layer of the untrained global student model 314 can be updated to arrive at a trained first layer thereof. This training continues layer by layer until all the layers of the global student model 314 are trained. Then, in subsequent rounds, the updated global student model weights can be transmitted back to newly selected client devices 320 for a next round of training of the global student model 314.

Figure 11:
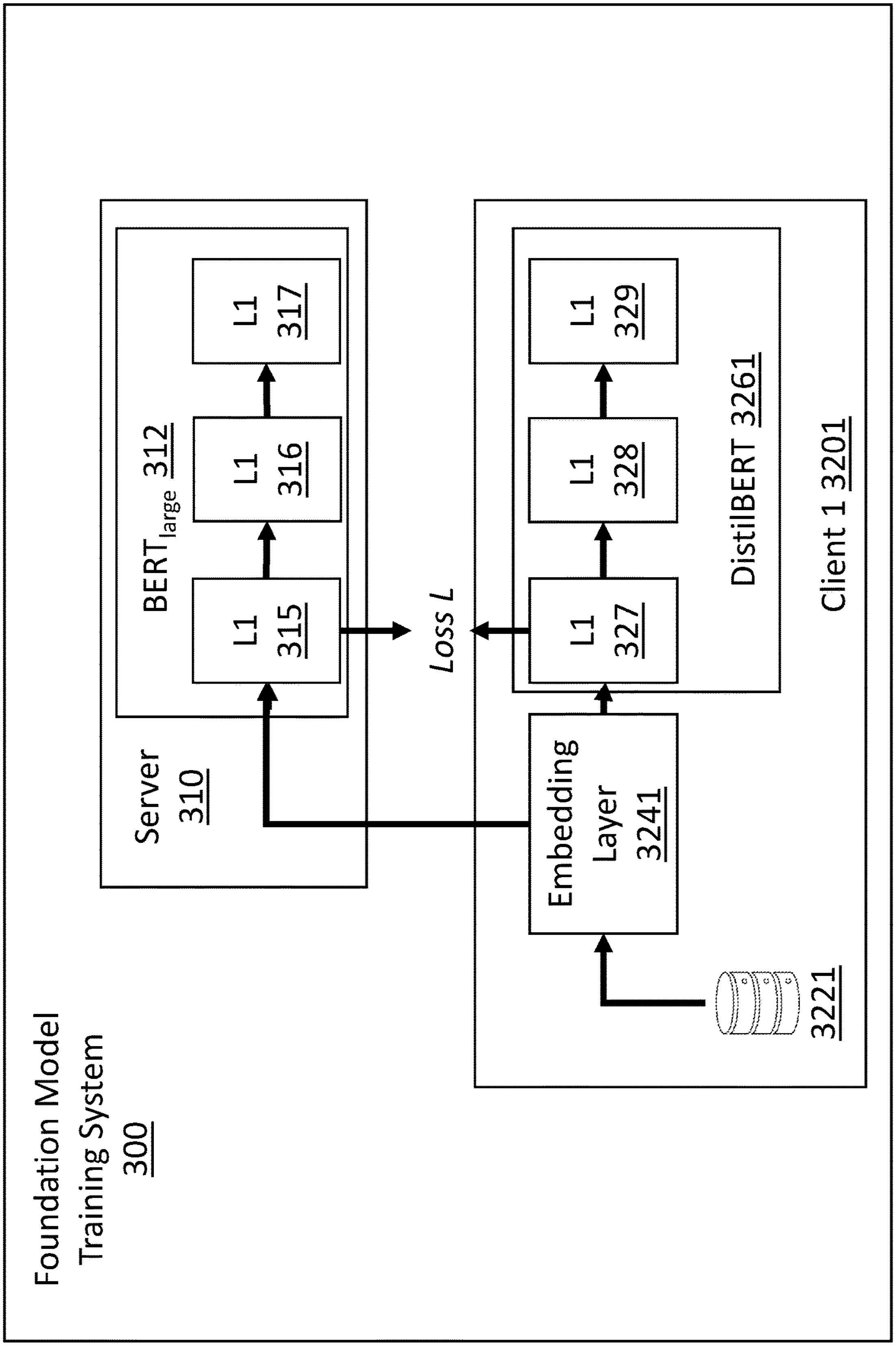
FIG. 11 is a detailed schematic illustration of an exemplary system of training models, depicting a first layer of a client device being trained with a corresponding first layer of the foundation model, according to an embodiment of the disclosure.
Figure 12:
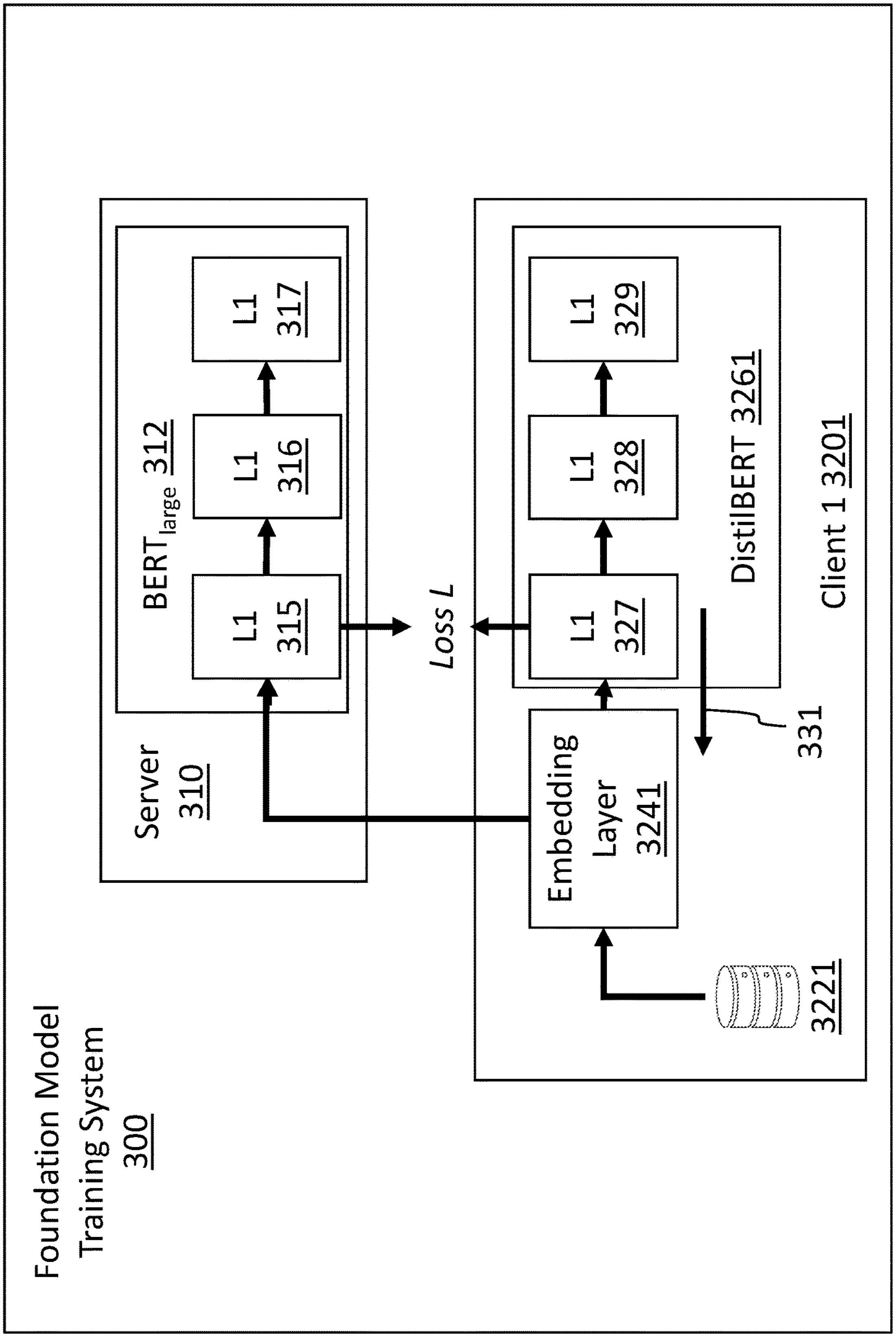
FIG. 12 is a detailed schematic illustration of an exemplary system of training models, depicting the iterative training of the first layer of the local student model on the client device, according to an embodiment of the disclosure.
Figure 13:
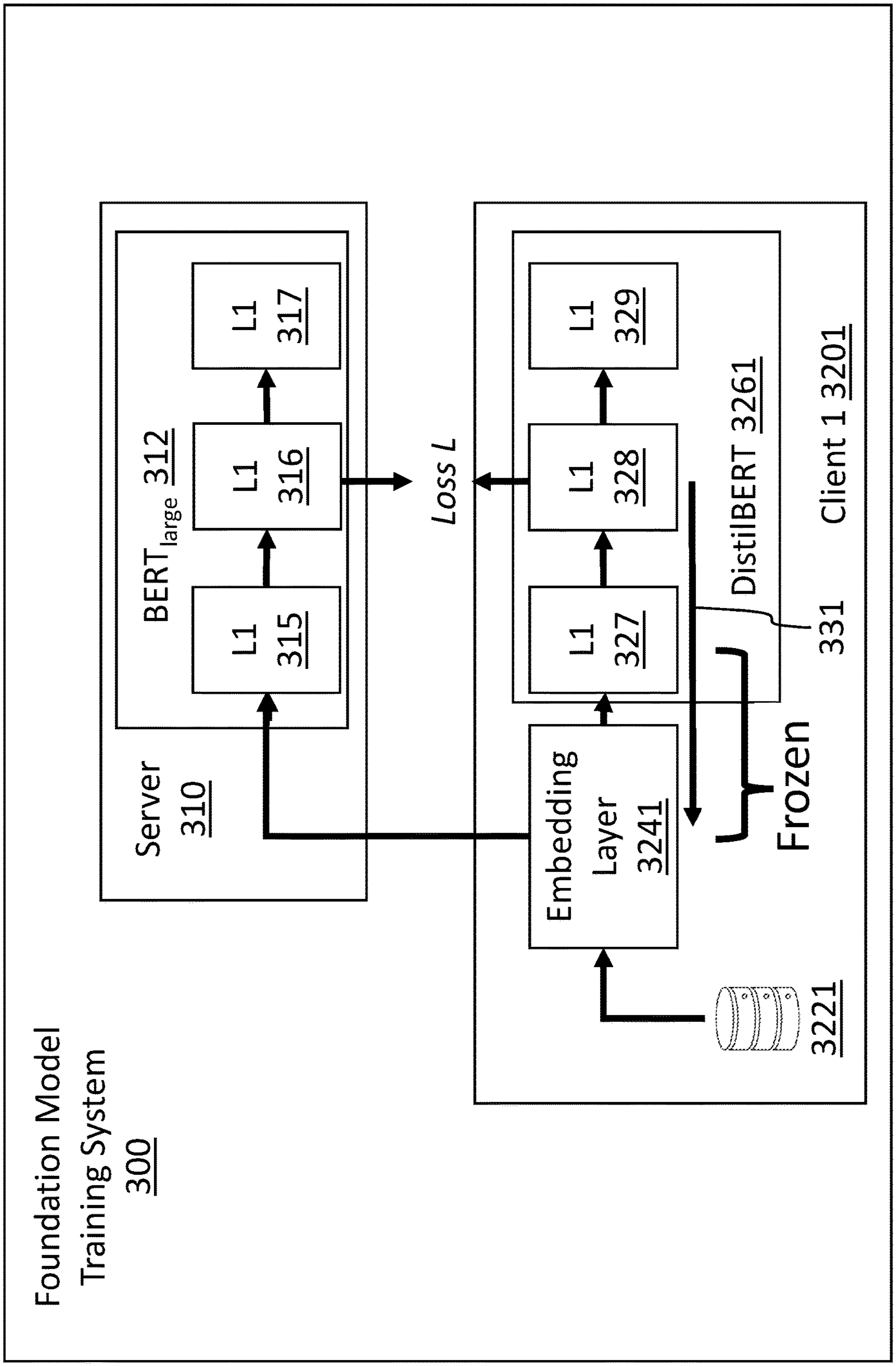
FIG. 13 is a detailed schematic illustration of an exemplary system of training models, depicting the iterative training of a second layer of the local student model on the client device, according to an embodiment of the disclosure.

The foregoing description with respect to FIGS. 2-10 is a simplified description/illustration of how the training of a global student model using local student models can occur, according to an embodiment of the disclosure. FIGS. 11-13 show these steps in greater detail (e.g., the intermediary steps between calculating the loss in FIG. 7 and arriving at fully trained student models 3261, 3262 that are aggregated in FIG. 9), according to an embodiment of the disclosure.

FIG. 11 is a detailed schematic view of a method to train Client 1's student model 3261 using the foundation model 312, according to an embodiment of the disclosure. While only Client 1 3201 is depicted, it will be appreciated that the following discussion applies to all the clients included in the overall system 300, of which there may be many. As discussed above, both the teacher model 312 and the student model 3261 have a plurality of layers (e.g., layers 327-329 in the student model 3261 and layers 315-317 in the teacher model). Each corresponding layer L1 in the teacher model 312 and the student model 3261 have similar architecture but different weights, and the student model layers have a fewer number of parameters. On the client side, and as also discussed above, the client data 3221 is given as an input to the embedding layer 3241 (which is pre-trained by the teacher model 312 and frozen), which passes the embedding layer output back to the server 310 and to the student model 3261 on the client device 3201.

As shown in the sequence from FIGS. 11-13, embodiments of the present disclosure can perform a layer-by-layer training by comparing the loss values between corresponding layers 315-317 of the teacher model 312 and the student model layers 327-329. As shown in FIG. 11, the embedding layer output is used as an input run through a first layer of both the teacher model 312 and the local student model 3261. The layer output of the teacher model 312 is then transmitted to the client device 3201. Based on the first layer outputs of the first layer of the teacher model 312 and the first layer of the local student model 326, the loss can be calculated and used to train the student model first layer 327 iteratively (i.e., trained until the first layer outputs converge). As denoted by arrow 331, the student model first layer 327 is trained on the client device 3201 until convergence (i.e., loss does not decrease further) with the teacher model first layer 327 occurs.

In some embodiments, the client device 3201 monitors the convergence status and communicates that convergence status with the server 310. Once there is client consensus on the convergence of a respective layer L1 (i.e., all the client devices 320 have converged at the layer and it is fully trained), an aggregation process can occur at the server level to arrive at a trained first layer of the global student model 314 (see FIG. 9), and the server 310 can change the training layer to the subsequent layer (e.g., the second layer) and continue the training process in the same fashion (FIG. 13). For example, the aggregation process can include calculating federated average by using a weighted averaging process, where the weights are the number of datapoints in a client FIG. 13 depicts a detailed schematic view of the system 300 once the student model first layer 327 has been fully trained. When that occurs, the weights of the student model first layer 327 are frozen. Then, the training continues onto the student model second layer 328 (e.g., by calculating its loss relative to the corresponding teacher model second layer 316), again with the embedding layer output as the input for the student model second layer 328 and the teacher model second layer 316. In a similar manner as discussed above, the second layer output of the teacher model 312 can be sent to the client device 3201 and compared with the output of the second layer 328 of the local student model 3261 to calculate a loss of the second layer. Training of the second layer 328 continues until it also reaches convergence, at which point in time its weights are similarly frozen. Once again, after the second layers across all the client devices reach convergence, aggregation can occur and the second layer of the global student model 314 can be updated.

This process continues iteratively with the student model third layer 329 (trained with the corresponding teacher model third layer 317) and so on until all the layers of the global student model 314 are trained based on aggregation of the respective layers. Once that occurs, the round of training of the student model 3261 ends.

Further, while the above describes a process in which aggregation occurs layer by layer, alternatively, upon completion of all the training of the individual layers on the student models 326 across the selected client devices 320, all the layers can be aggregated at a single time, rather than doing it as each layer is trained.

Figure 14:
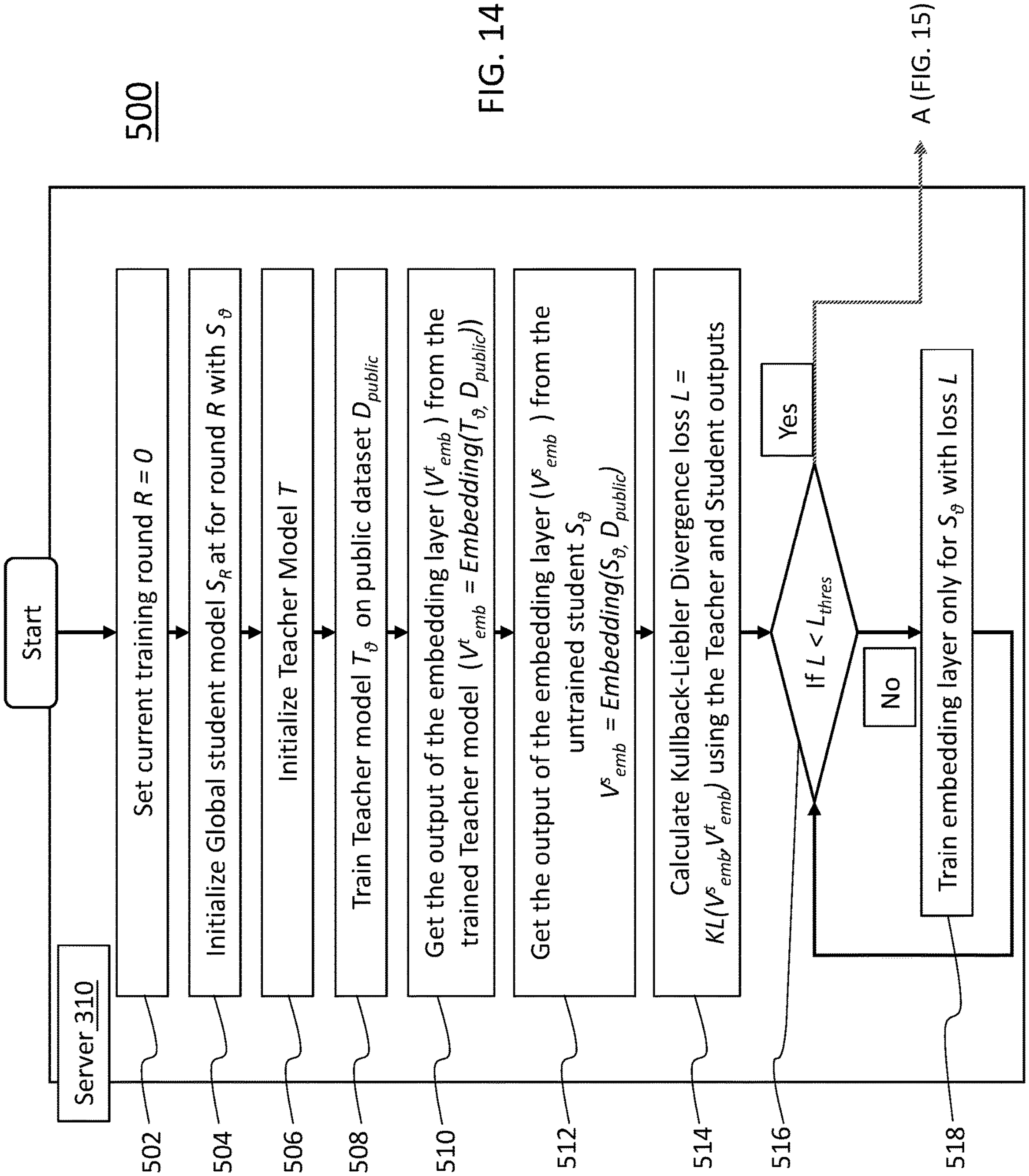
FIGS. 14-16 depict a flow chart of a method in accordance with the present disclosure, according to an embodiment of the disclosure.
Figure 15:
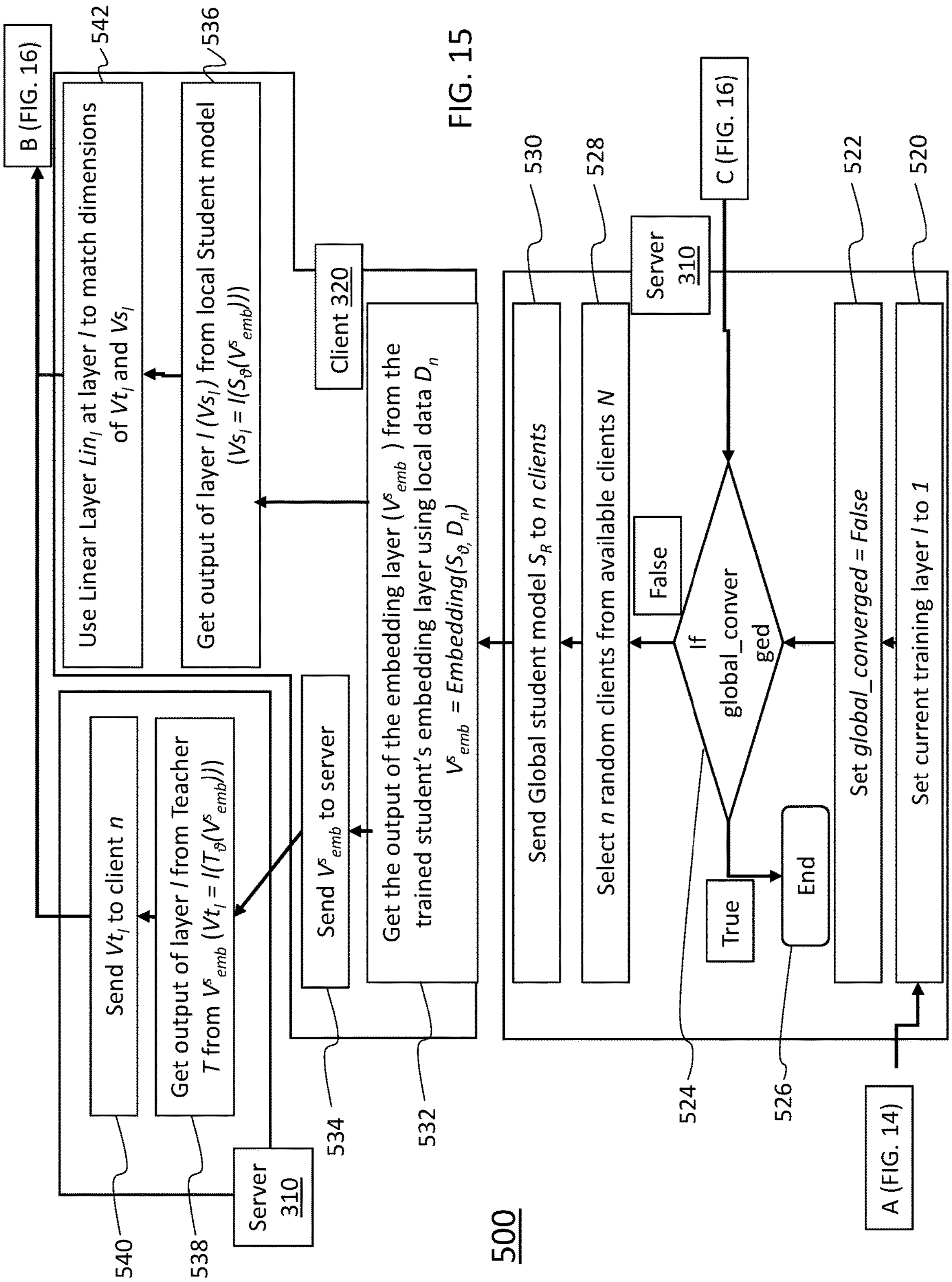
Figure 16:
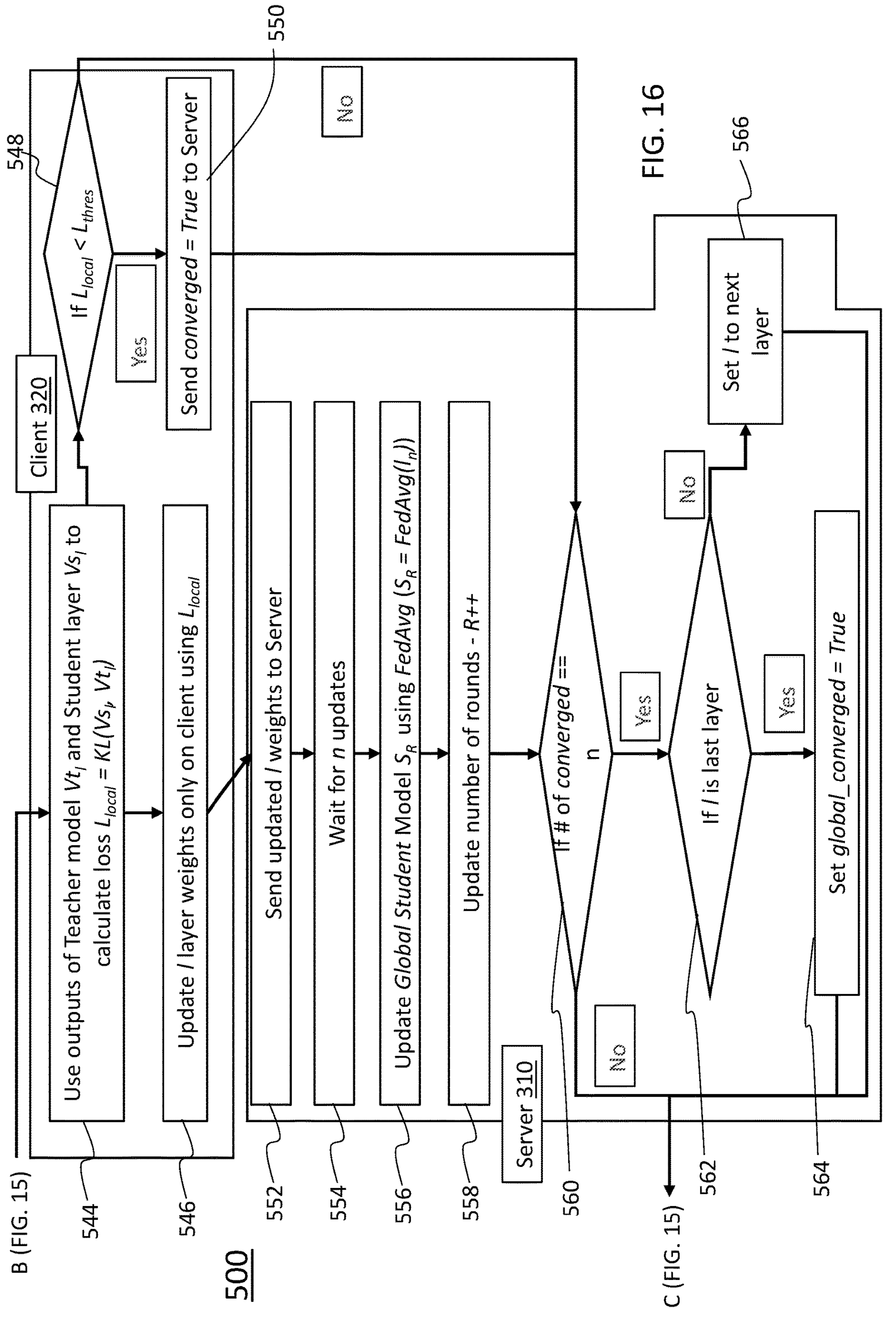

FIGS. 14-16 depict a detailed flow chart of a method 500 in accordance with the present disclosure.

FIG. 14 depicts training steps of the teacher model 312. The current training round is set to R=0 (Step 502). As used herein, a round refers to one layer from each client being trained until convergence occurs, and then the weights from that layer being sent back to the server 310 for aggregation. The global student model $S_R$ is initialized at for round R with the initial global student model $S_\theta$ (Step 504). The teacher model is initialized (Step 506). The teacher model is trained on a public dataset (Step 508). In order to initially train the global student model's embedding layer, the output of the teacher model embedding layer is obtained from the trained teacher model (Step 510). The output of the embedding layer is obtained from the untrained student model So (Step 512). The Kullback-Liebler divergence loss L is calculated using the teacher and student outputs (Step 514). A determination is then made if the loss is less than a threshold (Step 516). The threshold indicates whether the student model's embedding layer has been sufficiently trained to mimic the output of the teacher's embedding layer. If it is not, the embedding layer is trained for the initial global student model $S_\theta$ with loss L (Step 518) and the loss L is again compared against the threshold loss L. Once loss L is less than the threshold loss L, the embedding layer of the initial global student model $S_\theta$ is determined to be fully trained. It is then frozen, and the method 400 continues to the flow chart depicted in FIG. 15 (connected at arrow A in both figures).

Referring to FIG. 15, the server defines the current training layer and global student model's convergence status. Specifically, the current training layer l is set to 1 (Step 520) and global_converged is set to equal "False" (Step 522). Global_converged is a variable used to keep track of the current state of the global student model 314. It will only set to true when all layers of the student model 326 from all clients have converged, indicating that no more training is needed. If global_converged (Step 524) is True, the process ends (Step 526). If global_converged is False, n random clients from available clients N (a larger group than n) are selected (Step 528). In other words, the server 310 sub-samples from all available clients N. Once the clients are selected, the global student model $S_R$ with the trained and frozen embedding layer is sent to the n clients (Step 530) in a first round. On the client device 320, the output of the embedding layer is obtained by using local client data (Step 532). In parallel, the output of the embedding layer is transmitted to the server 310 (Step 534) and that output is also run through an l layer of the local student model to get an output of layer l (Step 536). On the server 310, the output of the embedding layer is used to execute a forward pass of the teacher model to generate an output of layer l (i.e., the same layer l as the local student model) from the teacher model 312 (Step 538). This output of layer l from the teacher model 312 is then sent to the n clients (to the client devices 320). Further, on the client device 320, linear layer $Lin_l$ is used at layer l to match dimensions of $Vt_l$ and $Vs_l$ (Step 542). From here, the method 400 continues to the flow chart depicted in FIG. 15 (connected at arrow B in both figures).

As shown in FIG. 16, on the client device 320, the outputs of teacher model layer $Vt_l$ and student layer $Vs_l$ are used to calculate loss $L_{local}$ (Step 544). Then, l layer weights are updated on the client device 320 using $L_{local}$ (Step 546). In parallel, $L_{local}$ is compared against a threshold L. If $L_{local}<L_{thres}$, converged=True is sent to the server 310 (Step 550) and the method 400 continues to Step 560 (discussed in greater detail below). If $L_{local}$ is not less than $L_{thres}$, the method 400 continue to step 560 (discussed in greater detail below). Returning to Step 546, once l layer weights are updated on the client device 320, updated l weights are sent to the server 310 (Step 552). The server 310 waits for n updates (Step 554), meaning the server 310 counts the number of updated weights it has received until it receives updates from all n clients. Once n updates have been received, the layer l of the global student model is updated using federated averaging (Step 556). The number of rounds is updated (Step 558). As evaluated at Step 560, if the number of converged local models on clients (evaluated at Step 548) is the same as the number of clients transmitted the local models, the process 400 continues on to evaluate if l is the last layer (Step 562). If it is, global_converged is set to equal True (Step 564) and the method 400 loops back to Step 524 (see the connection at arrow C in both FIGS. 15 and 16) and, since global_converged=True, the method 400 ends at Step 526. If l is not the last layer, l is set to the next layer (Step 566) and loops back to Step 524. As evaluated at Step 560, if the number of converged local models on clients (evaluated at Step 548) is not the same as the number of clients transmitted the local models, the method 400 loops back to Step 524 and repeats Steps 524-560 until the number of converged is the same as n.

Thus, the global student model is able to be trained layer by layer without the client devices 320 sharing any of the private data sets with the server 310. By implementing federated learning in the above-described way, computational load on client devices 310 is therefore minimized by offloading portions of it to the server 310 without transmitting client data 322 to the server 310.

As those skilled in the pertinent art will appreciate, and as made clear from the foregoing, the present disclosure has many potential uses. For example, it can be used within various operating systems (e.g. IBM z/OS™), security solutions (e.g., IBM Security), and advertising services (e.g., Watson Advertising™). It can be an integral solution for resolving client identity across devices, such as, but not limited to, IOT devices, smart phones, desktop computers, smart TVs, and the like. It can be used within platforms to manage identities for operating systems (OS) on original equipment manufacturer (OEM) devices. It can also be used as a privacy-first component of non-OS software, such as browsers or other applications which operate separately from the OS.

Further, alternative embodiments of the present disclosure may include the following. Direct matrix computation may be used instead of using learnable linear weights. Further, rather than training layer by layer as discussed above, every layer can be trained simultaneously with just one forward pass. Further, batch computation can be used for multiple local epochs.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 17:
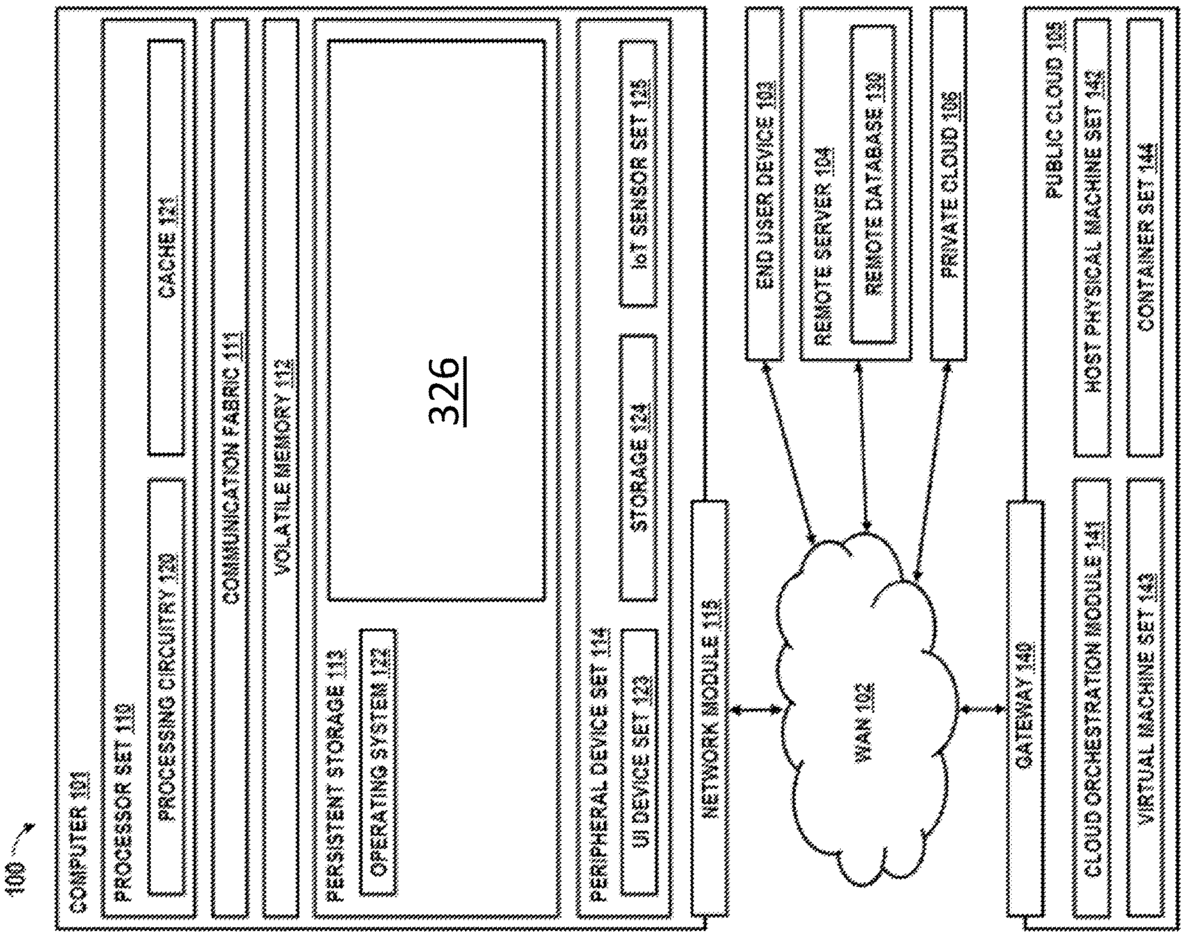
FIG. 17 is a schematic illustration of an exemplary computing system of training models, according to an embodiment of the disclosure.

FIG. 17 depicting a computing environment system 100, contains an example of an environment (in which above-described system 300 can be deployed) for the execution of at least some of the computer code involved in performing the inventive methods, such as training the global student model 314 in accordance with the system 300 and method 500 described above. In addition to a local student model 326, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 (e.g., client device 320) may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. On the contrary, these terms/phrases only require at least a single feature/element with the possibility of a plurality of such features/elements being within the scope of the description and claims.

In addition, it should be appreciated that the description uses a plurality of various examples for various elements of the illustrative embodiments to illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description, that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method of training a global student model, comprising: storing, on a server, the global student model comprising a first layer and a teacher model comprising a first layer;

transmitting, from the server and to one or more client devices, local student models based on the global student model, each client device comprising a corresponding data set, the local student models each comprising an embedding layer and a first layer;

inputting, on each client device of the one or more client devices, the corresponding data set to the embedding layers of the local student models to generate a plurality of embedding layer outputs;

receiving, at the server, an embedding layer output of the plurality of embedding layer outputs of one of the local student models;

performing, on the server, a forward pass on the first layer of the teacher model, with the embedding layer output as an input, to generate a teacher model first layer output;

transmitting, from the server and to the one or more client devices, the teacher model first layer output;

updating, on each client device of the one or more client devices, first layer weights of the local student models based on a loss between the teacher model first layer output and a student model first layer output, each generated using the embedding layer output;

receiving, at the server, the first layer weights of the local student models; and calculating, on the server, first layer weights of the global student model using the received first layer weights of the local student models.

2. The computer-implemented method of claim 1, wherein the local student models are each transmitted to a different client device of the one or more client devices.

3. The computer-implemented method of claim 2, wherein the local student model training layer weights are aggregated by weighing the local student models based on training sample size.

4. The computer-implemented method of claim 2, wherein calculating, on the server, the first layer weights of the global student model comprises a federated averaging process.

5. The computer-implemented method of claim 1, further comprising:

training, on the server, the teacher model on public datasets.

6. The computer-implemented method of claim 1, further comprising:

selecting, by the server, a number of clients to transmit the first teacher model output from a number of available clients, each selected client receiving one of the local student models.

7. The computer-implemented method of claim 6, wherein each client of the number of clients comprises one or more client devices.

8. The computer-implemented method of claim 7, wherein each client device comprises locally stored data sets.

9. The computer-implemented method of claim 1, wherein the embedding layer output does not comprise data from a data set stored locally on a client device.

10. The computer-implemented method of claim 1, wherein the embedding layer is pre-trained on the server using the teacher model.

11. The computer-implemented method of claim 10, wherein the local student models are not transmitted until a loss of the embedding layer is less than a threshold loss.

12. The computer-implemented method of claim 1, further comprising:

performing, on the server, a forward pass on a second layer of the teacher model, with the embedding layer output as an input, to generate a teacher model second layer output;

transmitting, from the server, the teacher model second layer output;

receiving, at the server, second layer weights of the local student models; and calculating, on the server, second layer weights of the global student model using the received second layer weights of the local student models.

13. A computer-implemented method of training a global student model, comprising: receiving, on a client device comprising a data set, from a server, a local student model based on the global student model, the local student model comprising an embedding layer and a first layer;

inputting, on the client device, the data set to the embedding layer to generate an embedding layer output;

transmitting, from the client device and to the server, the embedding layer output;

performing, on the client device, a forward pass on the first layer, with the embedding layer output as an input, to generate a student model first layer output;

receiving, on the client device and from the server, a teacher model first layer output;

calculating, on the client device, a loss based on the student model first layer output and the teacher model first layer output, wherein the student model first layer output and the teacher model first layer output are generated using the embedding layer output;

training, on the client device, the first layer of the local student model until the student model first layer output converges with the teacher model first layer output; and transmitting, from the client device and to the server, first layer weights of the first layer of the local student model.

14. The computer-implemented method of claim 13, wherein the embedding layer output does not comprise data from the data set.

15. The computer-implemented method of claim 13, further comprising:

performing, on the client device, a forward pass on a second layer of the local student model, with the embedding layer output as an input, to generate a student model second layer output;

receiving, on the client device, a teacher model second layer output;

calculating, on the client device, a loss based on the local student model second layer output and the teacher model second layer output;

training, on the client device, the second layer of the student model until the student model second layer output converges with the teacher model second layer output; and transmitting, from the client device, second layer weights of the second layer of the local student model.

16. The computer-implemented method of claim 13, wherein the client device uses linear layers to match the local student model first layer output and the teacher model first layer output.

17. The computer-implemented method of claim 13, wherein the client device trains the local student model using a Kullback-Leibler loss function.

18. A system of training a global student model stored on a server, the server comprising a processing device and a memory comprising instructions that are executed by the processing device to perform a method comprising:

storing, on the server, a global student model comprising a first layer and a teacher model comprising a first layer;

transmitting, from the server and to one or more client devices, local student models based on the global student model, each client device comprising a corresponding data set, the local student models each comprising an embedding layer and a first layer;

inputting, on each client device of the one or more client devices, the corresponding data set to the embedding layers of the local student models to generate a plurality of embedding layer outputs;

receiving, at the server, an embedding layer output of the plurality of embedding layer outputs of one of the local student models;

performing, on the server, a forward pass on the first layer of the teacher model, with the embedding layer output as an input, to generate a teacher model first layer output;

transmitting, from the server and to the one or more client devices, the teacher model first layer output;

updating, on each client of the one or more client devices, first layer weights of the local student models based on a loss between the teacher model first layer output and a student model first layer output, each generated using the embedding layer output;

receiving, at the server, the first layer weights of the local student models; and calculating, on the server, first layer weights of the global student model using the received first layer weights of the local student models.

19. The system of claim 18, wherein the local student models are each transmitted to a different client device of the one or more client devices.

20. The system of claim 18, wherein the received embedding layer output does not comprise data from a data set stored locally on a client device.

* * * * *